United States Patent
Henry

(10) Patent No.: US 7,145,078 B2
(45) Date of Patent: Dec. 5, 2006

(54) DETACHABLE HAND RAIL FOR MODULAR CABLE PROTECTORS

(76) Inventor: Stephen K. Henry, 3825 Northbrook Dr., #F, Boulder, CO (US) 80302

( * ) Notice: Subject to any disclaimer, the term of this patent is extended or adjusted under 35 U.S.C. 154(b) by 0 days.

(21) Appl. No.: 11/408,397

(22) Filed: Apr. 21, 2006

(65) Prior Publication Data

US 2006/0238926 A1    Oct. 26, 2006

Related U.S. Application Data

(60) Provisional application No. 60/674,486, filed on Apr. 25, 2005.

(51) Int. Cl.
  *H02G 3/30* (2006.01)
  *E01B 7/28* (2006.01)

(52) U.S. Cl. ............... 174/101; 174/72 C; 174/97; 14/69.5; 104/275

(58) Field of Classification Search ......... 174/50, 174/68.1, 70 C, 70 R, 72 C, 95, 97, 101, 174/481, 482, 484; 14/69.5; 104/275; 138/103, 138/105, 106, 110; 404/3; D13/155; 52/220.5, 52/220.7, 561, 590.3

See application file for complete search history.

(56) References Cited

U.S. PATENT DOCUMENTS

| | | | |
|---|---|---|---|
| 585,540 A * | 6/1897 | Spangler | .................. 104/275 |
| 883,186 A | 3/1908 | Fine | |
| 1,914,830 A | 6/1933 | Kostohris | |
| 2,027,619 A | 1/1936 | Rutherford | |
| 2,166,031 A | 7/1939 | Wendell | |
| 2,594,425 A | 4/1952 | Greenberg | |
| 2,927,396 A | 3/1960 | Hall, Jr. | |
| 3,888,186 A * | 6/1975 | Jentzsch et al. | ............ 104/275 |
| 3,965,967 A | 6/1976 | Jentzsch et al. | |
| 4,067,258 A | 1/1978 | Valeri | |
| 4,101,100 A | 7/1978 | Smith et al. | |
| 4,373,306 A | 2/1983 | Rech | |
| 4,677,799 A | 7/1987 | Zarembo | |
| 4,817,224 A | 4/1989 | Visnaw et al. | |
| 4,819,910 A | 4/1989 | Johnston | |
| 5,095,822 A | 3/1992 | Martin | |
| 5,267,367 A | 12/1993 | Wegmann, Jr. | |
| 5,347,672 A * | 9/1994 | Everard et al. | .............. 14/69.5 |
| 5,446,937 A | 9/1995 | Haskins | |
| 5,566,622 A | 10/1996 | Ziaylek, Jr. et al. | |
| 5,777,266 A | 7/1998 | Herman et al. | |
| D412,490 S | 8/1999 | Henry | |
| 5,933,898 A | 8/1999 | Estes et al. | |
| D415,112 S | 10/1999 | Henry | |
| D415,471 S | 10/1999 | Henry | |
| D418,818 S | 1/2000 | Henry | |
| D429,695 S | 8/2000 | Henry | |
| D437,832 S | 2/2001 | Henry | |
| 6,202,565 B1 | 3/2001 | Henry | |
| 6,481,036 B1 | 11/2002 | Duvall | |

* cited by examiner

*Primary Examiner*—Dean A. Reichard
*Assistant Examiner*—Adolfo Nino
(74) *Attorney, Agent, or Firm*—Dorr, Carson & Birney, P.C.

(57) ABSTRACT

A hand rail member can be removably attached to the side ramps of a modular cable protector. The hand rail member has a body with a base shaped to allow a series of cable protectors to be attached together in an end-to-end fashion, connectors for attaching the hand rail member to corresponding connectors on the side ramps of a modular cable protector, and a hand rail extending across the top of the hand rail member.

20 Claims, 8 Drawing Sheets

DETACHABLE HAND RAIL FOR MODULAR CABLE PROTECTORS

RELATED APPLICATION

The present application is based on and claims priority to the Applicant's U.S. Provisional Patent Application 60/674,486, entitled "Detachable Hand Rail For Modular Cable Protectors," filed on Apr. 25, 2005.

BACKGROUND OF THE INVENTION

Field of the Invention. The present invention relates generally to the field of modular cable protectors. More specifically, the present invention discloses a detachable hand rail for modular cable protectors.

Statement of the Problem. Hose and cable bridging protective devices have been used in the past to prevent damage for hoses, cables, wiring and the like by vehicles and pedestrians. These cable protectors also help to minimize the risk of pedestrians tripping over cables. For the purposes of this disclosure, the term "cable" should be broadly interpreted to include cables, hoses, electrical wiring, conduits, optical fibers, pneumatic tubing, plumbing, and the like.

Conventional cable protectors include one or more channels extending in parallel between the ends of the cable protector to receive the cables. Side ramps or beveled edges extend laterally outward from both sides of the cable protector to allow vehicles to roll over the top of the cable protector. Each cable protector typically includes a set of end connectors that enable a series of cable protectors to be attached together in a modular end-to-end fashion to any desired length.

Navigating the side ramps of a cable protector can be a significant problem for handicapped people, and for people with baby strollers, walkers, bicycles, tricycles, scooters, wagons, roller blades, skateboards, and the like. In particular, wheeled vehicles can roll off the lateral edge of the ramp, which can tip the vehicle or jolt the passenger. There is also a possibility that a pedestrian could stumble over, or trip off the lateral edge of the ramp. In addition, side ramps can create a trip hazard for people walking parallel to the cable protectors.

One response to these problems has been to attach removable short side rails to the edges of each side ramp, as taught in U.S. Pat. No. 6,481,036 (Duvall). This approach makes it more difficult for a wheeled vehicle to accidentally roll off the edge of a side ramp. However, it does not really address the trip-hazard problem. In fact, short side rails might increase this risk to some degree. Finally, some elderly and handicapped individuals feel more comfortable when provided with a hand rail at a suitable ergonomic height. Therefore, a need exists for a hand rail attachment that can be used in conjunction with cable protectors to address the trip-hazard problem and provide a removable hand rail.

Solution to the Problem. The present invention provides a hand rail attachment that can be connected to the side ramps of a cable protector in a modular manner, and without interfering with the functionality of the cable protector. The height of the hand rail is selected to provide convenient hand support for pedestrians, and also to be readily gripped by a person in a wheelchair.

The hand rail member in the present invention is also very modular in that it can be quickly and easily attached to, and removed from a cable protector, as needed, using the conventional end connectors found on many cable protectors. This enables the hand rail members and cable protectors to be readily configured to meet the needs of a specific job.

SUMMARY OF THE INVENTION

This invention provides a hand rail member for removable attachment to the side ramps of a modular cable protector. The hand rail member has a body with a base shaped to allow a series of cable protectors to be attached together in an end-to-end fashion, connectors for attaching the hand rail member to corresponding connectors on the side ramps of a modular cable protector, and a hand rail extending across the top of the hand rail member.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
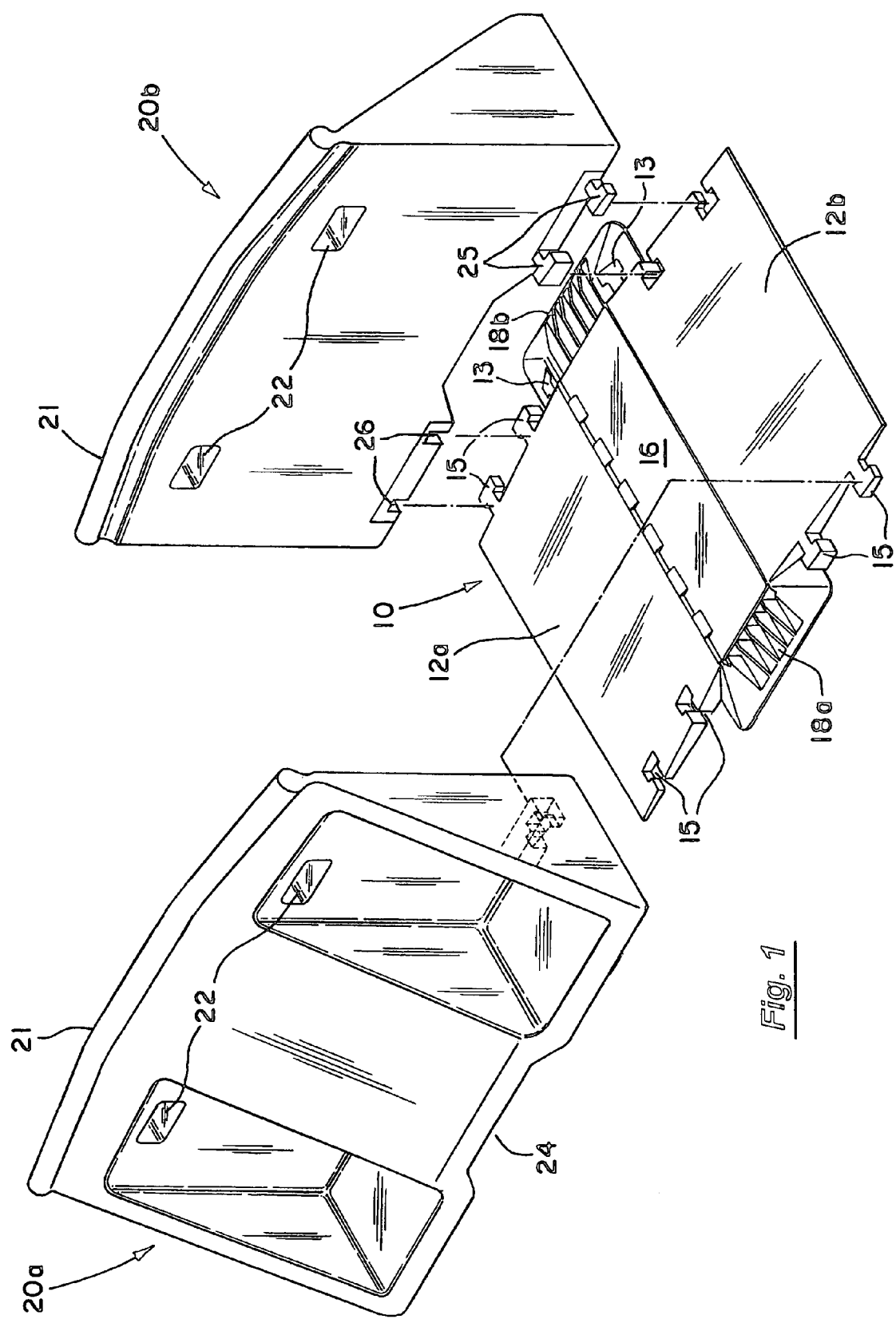
FIG. 1 is an exploded perspective view of a modular cable protector 10 with two hand rail members 20a, 20b and two detachable side extension ramps 12a, 12b.
Figure 2:
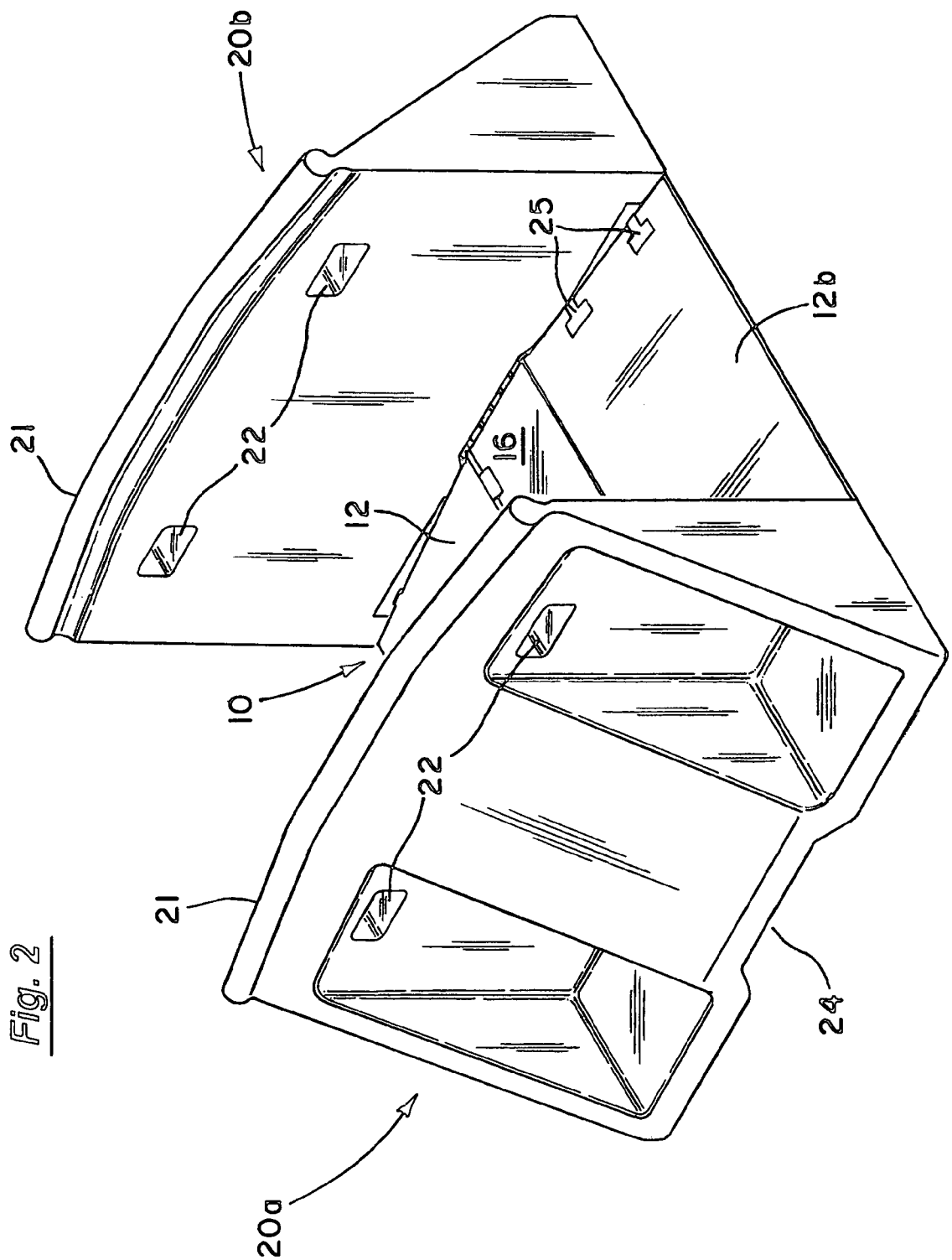
FIG. 2 is a perspective view of the assembly corresponding to FIG. 1.
Figure 3:
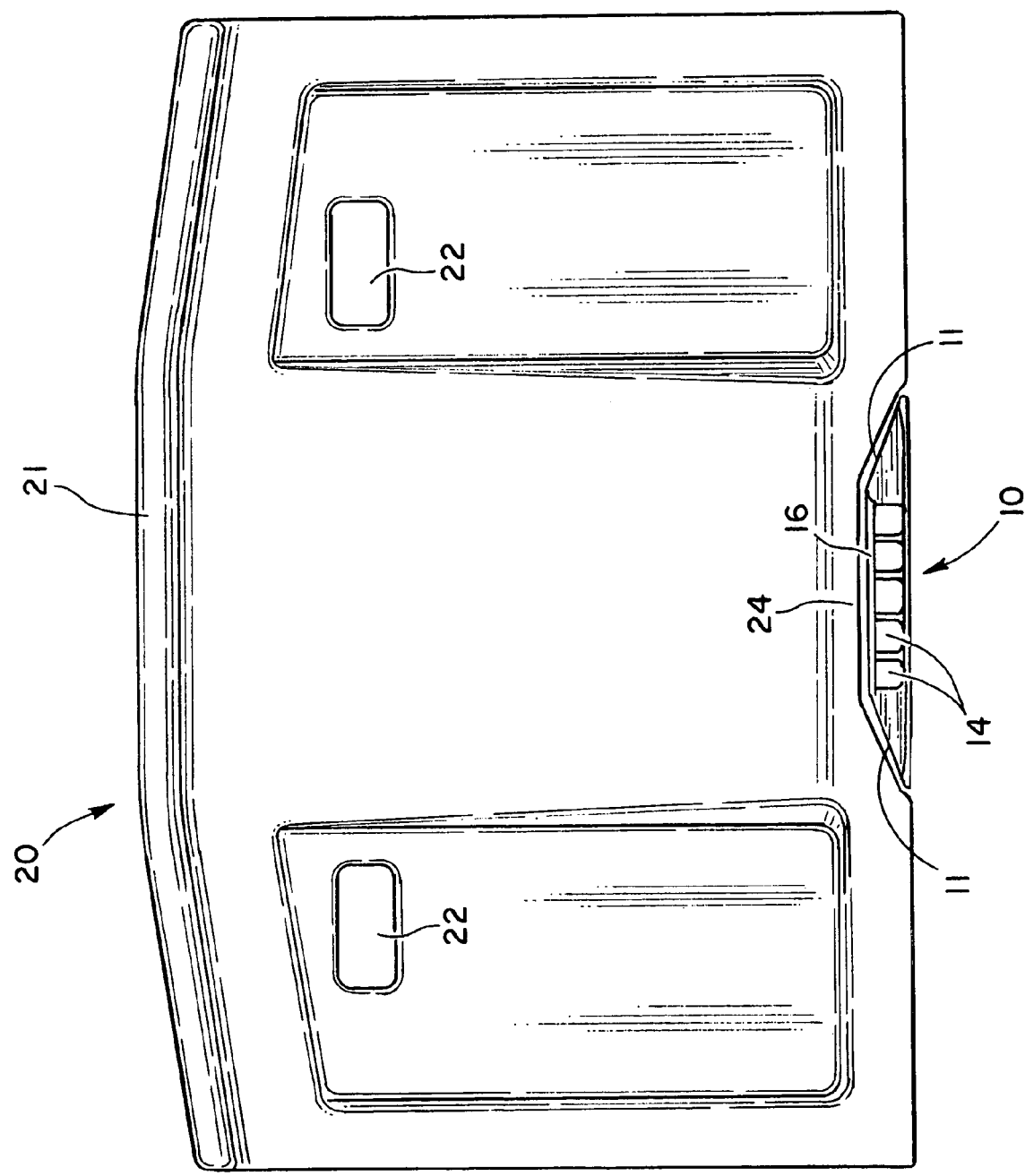
FIG. 3 is a side elevational view of the assembly corresponding to FIG. 1.

Turning to FIG. 1, an exploded perspective view is provided illustrating two hand rail members 20a, 20b and a cable protector 10 with two side extension ramps 12a, 12b. FIG. 2 is a perspective view and FIG. 3 is a side elevational view of the resulting assembly corresponding to FIG. 1.

The cable protector 10 can be of any conventional configuration and can have arbitrary dimensions and proportions. One example of a typical cable protector 10 shown in the exploded view provided in FIG. 1(a). The cable protector 10 includes a number of parallel channels 14 running the length of the central portion of the cable protector for holding cables, hoses, or the like. Two short side ramps 11 extend laterally outward from opposing sides of the cable protector 10. The channels 14 can be covered with a hinged lid 16 to provide a substantially flat surface for traffic crossing the cable protector 10. The central portion of each cable protector 10 also includes sets of male and female end connectors 13 that enable a series of cable protectors 10a, 10b, 10c, etc. to be attached together in an end-to-end fashion, as shown for example in FIG. 6, to create an assembly of any desired length. The size, shape and location of the end connectors 13 vary from model to model. When the cable protector 10 is used by itself or in series combination with other similar cable protectors 10a, 10b, 10c, etc., the side ramps 11 and lid 16 allow foot traffic and wheeled traffic to cross over the cable protector 10 without a great deal of effort. Optionally, short end segments 18a, 18b can be removably attached to the ends of the cable protector 10, as shown in FIGS. 1 and 1(a).

Figure 1A:
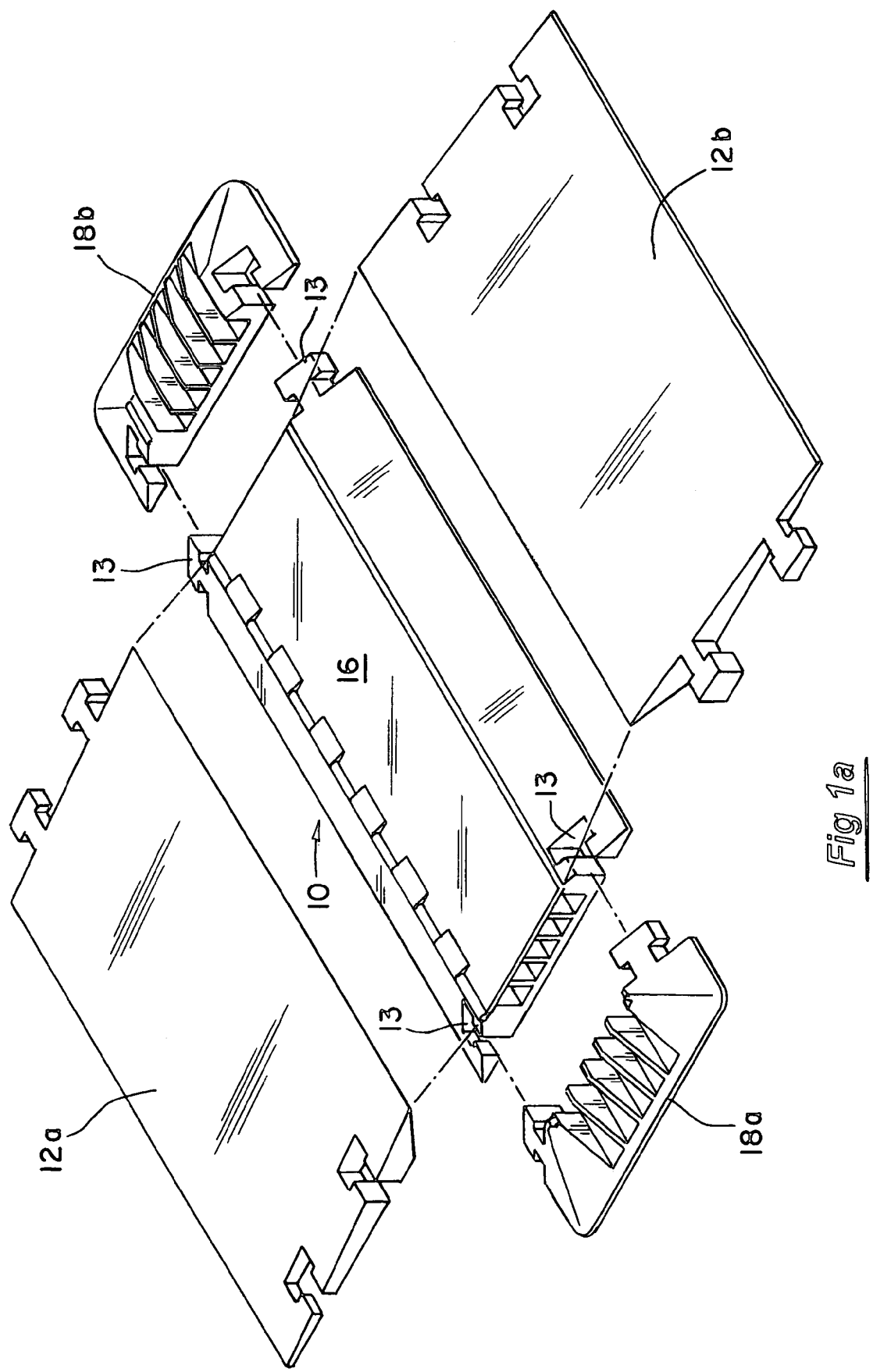
FIG. 1(a) is another exploded perspective view of the modular cable protector 10, side extension ramps 12a, 12b, and end segments 18a, 18b.

The cable protector 10 can also be equipped with two opposing side extension ramps 12a, 12b that cover the short side ramps 11 and extend laterally outward in a direction generally perpendicular to the channels 14 of the cable protector 10, as shown in FIGS. 1 and 1(a). The side extension ramps 12a, 12b provide a more gradual incline for foot traffic and wheeled vehicles crossing the cable protector. For example, this is particularly advantageous in facilitating wheel chair access. The side extension ramps 12a, 12b can have any desired width, length and grade. Each side extension ramp 12, 12b is typically formed as a separate piece that can be removably attached to the side of a cable protector 10 with connectors or clips (not shown). The side extension ramps 12a, 12b can be equipped with their own end connectors 15 on their edges, as shown in FIG. 1, to enable side extension ramps to be fastened together to create a ramp assembly of a desired width.

The base of the hand rail member 20a, 20b adjacent to the side extension ramps 12a, 12b is generally flat to provide stable contact with the ground. However, the central portion of the base of the hand rail member is shaped to allow a series of cable protectors to be attached together in an end-to-end fashion beneath the hand rail member. The embodiment depicted in the drawings has a recessed passageway 24 in the central portion of the base of the hand rail member that allows the hand rail member to sit atop the central portion and channels 14 of the cable protectors 10. This is shown most clearly in the top plan view of the assembly with four cable protectors 10a, 10b, 10c and 10d depicted in FIG. 6. Alternatively, if a single cable protector is used by itself, this passageway 24 provides room for cables to pass beneath the hand rail member 20.

Each hand rail member 20a, 20b is equipped with a number of sets of connectors 25, 26 for removably attaching the hand rail member to corresponding sets of end connectors 15 on the side extension ramps 12a, 12b, as shown in FIG. 1. For example, these connectors 25, 26 can have male and female shapes, respectively, to engage complementary female and male end connectors 15 on the side extension ramps 12a, 12b.

Figure 4:
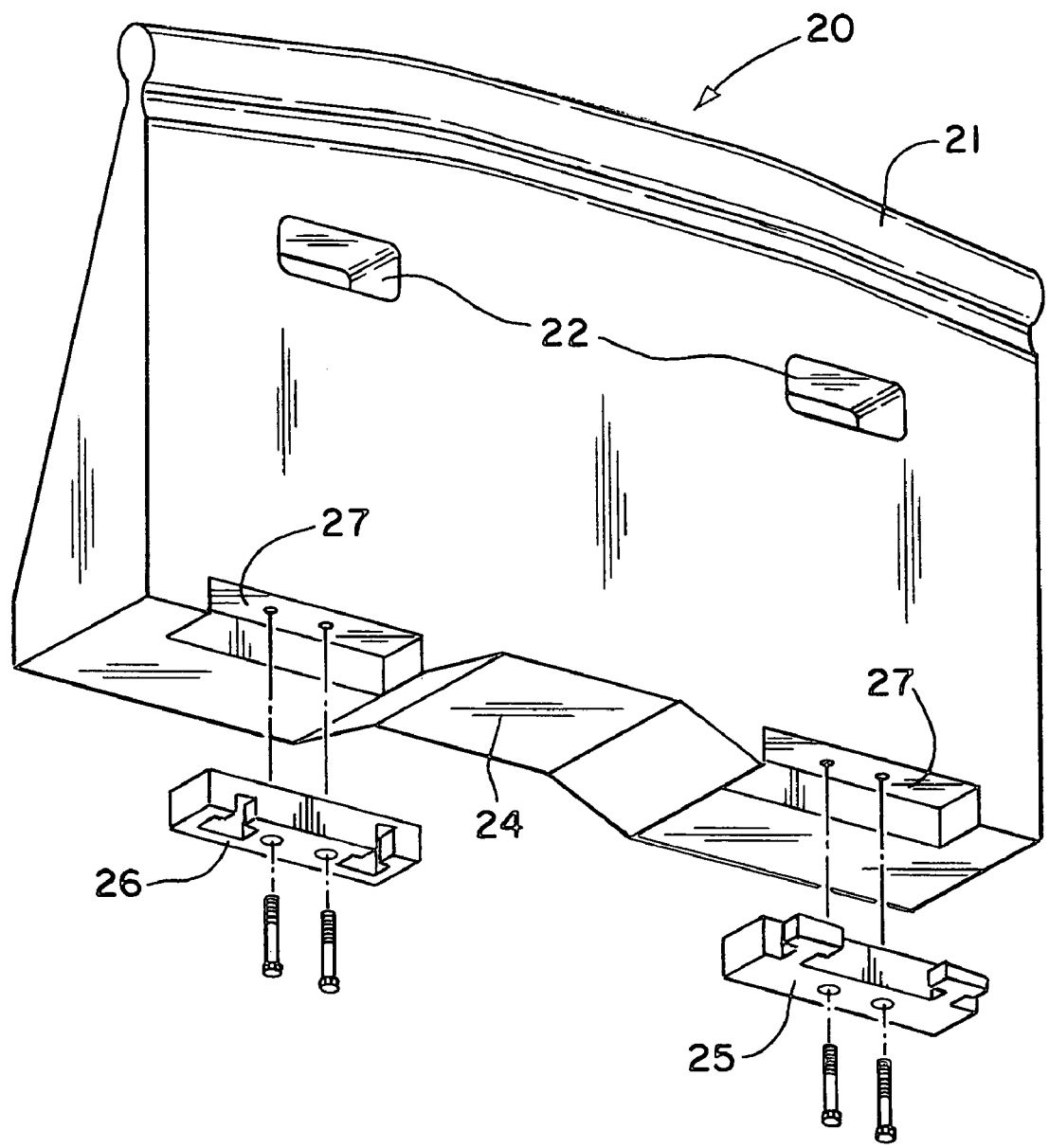
FIG. 4 is an exploded bottom perspective view of a hand rail member 20 with male and female connectors 25, 26.

The entire hand rail member 20 can be made of molded plastic. However, the detailed shapes of the connectors 25, 26 can complicate the molding process. The embodiment shown in the drawings addresses this problem by molding each set of connectors 25, 26 as a separate piece that is then secured in a recess 27 in the bottom of the hand rail member 20. FIG. 4 is an exploded bottom perspective view of a hand rail member 20 with male and female connectors 25, 26. It should be understood that other types of connectors could be used, and that other means for attaching the connectors to the side extension ramps 12a, 12b or cable protector 10 could be readily substituted.

A hand rail 21 extends across the top of the hand rail member 20. The elevation of the hand rail 21 is selected to provide a convenient hand support for pedestrians and people in wheelchairs. Its elevation should not be too low, so as to create a trip hazard. For example, the hand rail 21 can have an elevation of approximately 20 to 40 inches above the base of the hand rail member 20.

In the embodiment shown in the drawings, the hand rail members 20a, 20b have a generally triangular vertical cross-sectional shape to enhance stability and minimize the risk of tipping over or accidentally coming loose from the remainder of the assembly. However, it should be understood that other vertical cross-sectional shapes could be used (e.g., L-shape or an inverted T-shape). Graphics indicating that the assembly is wheelchair-accessible or handicapped-accessible can be placed on the exposed triangular ends or outer face of the hand rail member 20a, 20b.

A number of hand grips 22 can be formed in the vertical walls of the hand rail member 10, as shown for example in FIGS. 1 and 2. The hand grips 22 reduce the weight of the assembly and provide a convenient means for carrying the hand rail member 10. The spacing between the hand grips 22 and their dimensions can be selected to allow a conventional forklift to pick up and transport the hand rail member 20.

The hand rail member 20 can be formed with a number of voids to reduce weight and cost. If necessary, weight can be added to the assembly on site to increase its stability by placing sand bags in the flat, recessed regions of the hand rail member 20 beneath the hand grips 22. Optionally, a number of openings can be formed through the exterior shell of the hand rail member 20 so that the interior voids can be partially or completely filled with sand, water or other material to increase the weight and stability of the hand rail member 20 on site.

Optionally, the hand rail member could be made less substantial to reduce weight and cost, although this might tend to lessen its sturdiness. For example, the hand rail member could be designed with a base having connectors to removably engage complementary connectors on the side extension ramps or cable protector, a series of vertical members projecting upward from the base, and a hand rail extending across the vertical members.

It is important to note that the side extension ramps 12a, 12b are optional and the hand rail member 20a, 20b can be used either with or without the side extension ramps 12a, 12b. In the embodiment shown in FIG. 1, the hand rail members 20a, 20b are removably attachable to the side extension ramps 12a, 12b, which are in turn attached to a cable protector 10. However, it should be understood that the hand rail members 20a, 20b could be designed to be removably attachable directly to the end connectors 13 on a cable protector 10. In this embodiment, the side extension ramps 12a, 12b can be omitted, or the side extension ramps can be left unattached to the hand rail member, or the hand rail member can be provided with connectors that allow attachment to both the side extension ramps and cable protector.

To generalize, the term "modular cable protector" should be interpreted to include a cable protector 10 by itself, or a cable protector 10 in combination with one or more side extension ramps 12a, 12b. Thus, it can be said that the connectors 25, 26 of the hand rail members 20a, 20b removably attach to complementary connectors on a modular cable protector.

Figure 5:
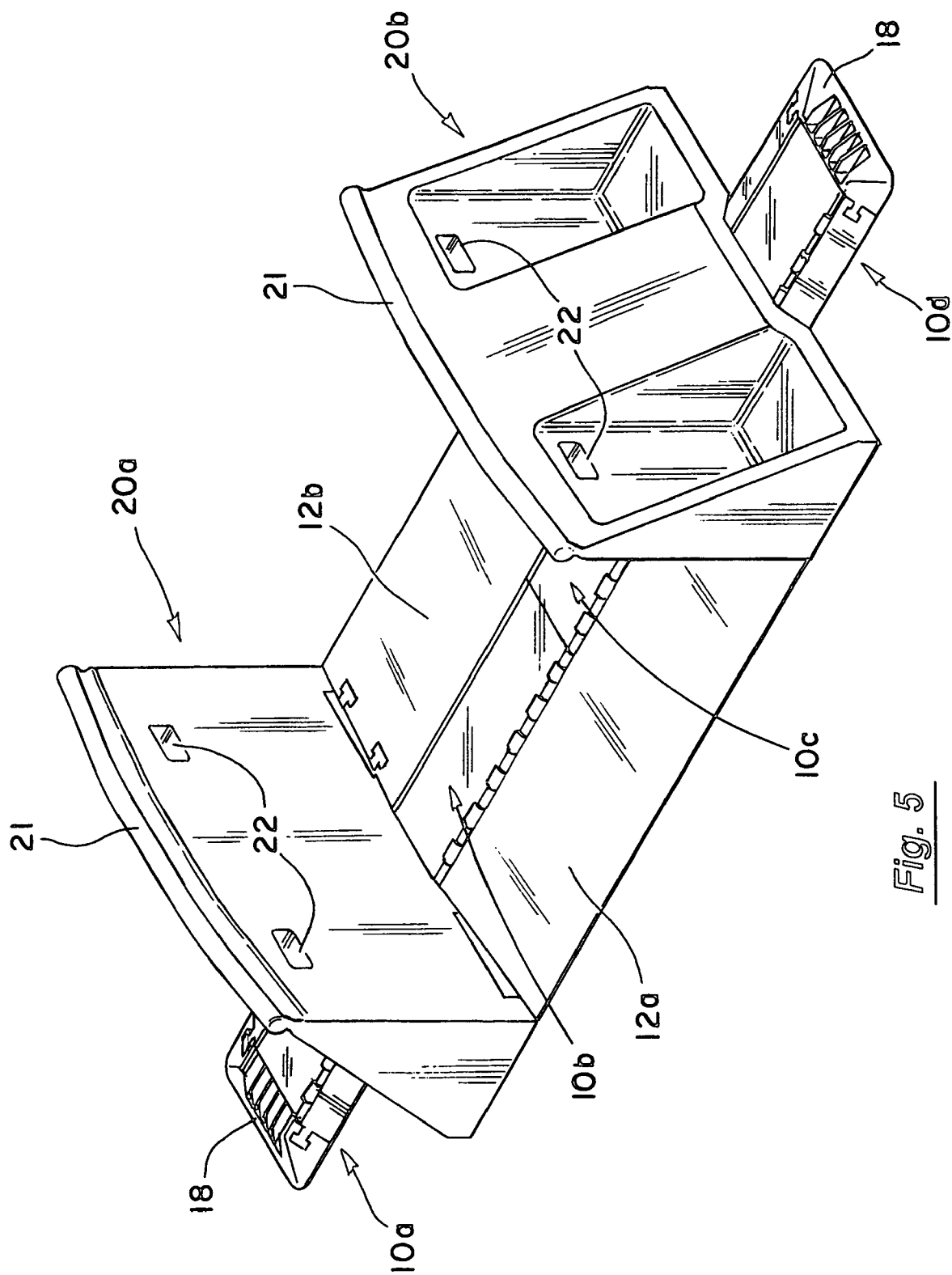
FIG. 5 is a perspective view of an alternative assembly of two hand rail members 20a, 20b with four cable protectors 10a-10d and detachable side extension ramps 12a, 12b.
Figure 6:
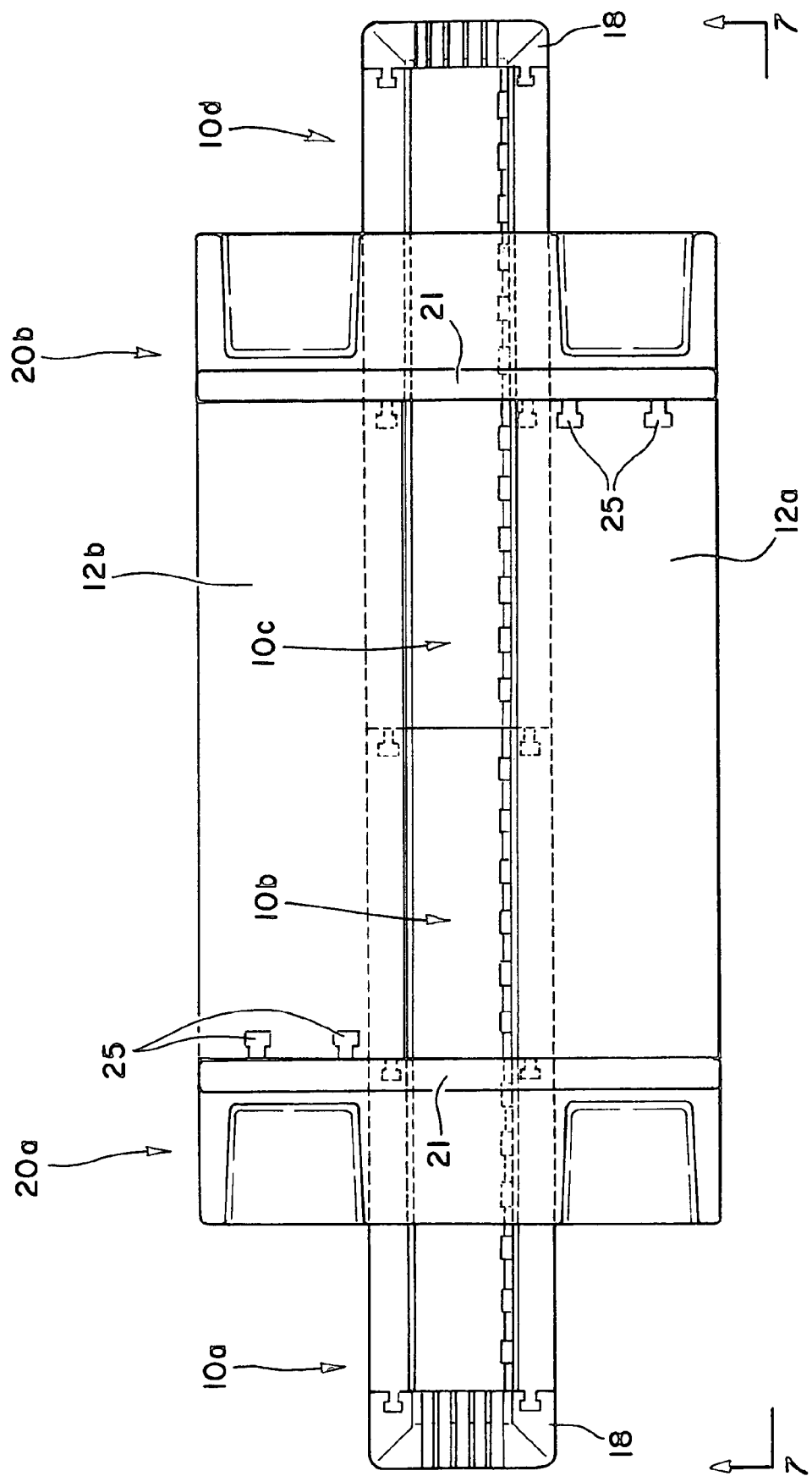
FIG. 6 is a top plan view of the assembly shown in FIG. 5.
Figure 7:
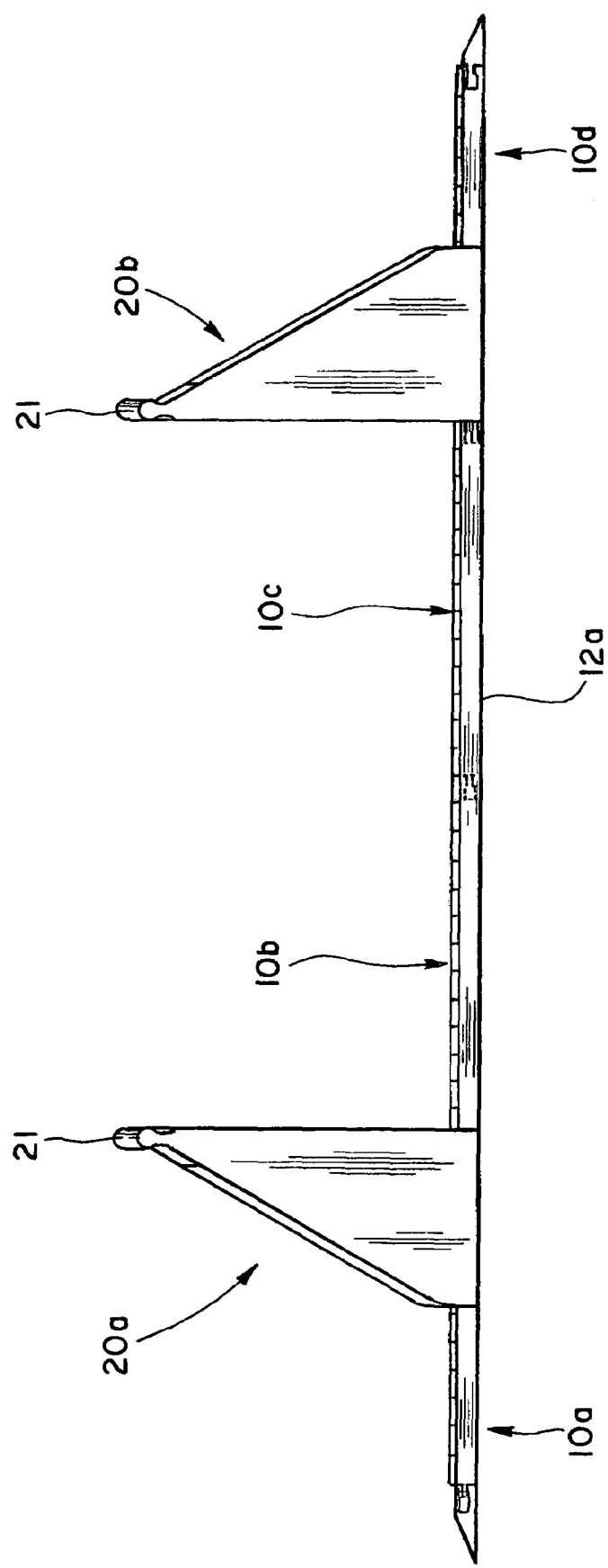
FIG. 7 is a front elevational view of the assembly shown in FIGS. 5 and 6.

FIG. 5 is a perspective view of an alternative assembly of two hand rail members 20a and 20b, four cable protectors 10a, 10b, 10c and 10d, and two side extension ramps 12a, 12b. FIG. 6 is a corresponding top plan view and FIG. 7 is a corresponding front elevational view of the assembly shown in FIG. 5. These are intended to show the modular nature of the present invention. The hand rail members 20a, 20b can be attached to a cable protector assembly of any length, and any number of cable protectors can be connected together in series to achieve any desired length.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A hand rail member for removable attachment to a modular cable protector having at least one channel, opposing side ramps extending laterally outward from the channel, and connectors for removably attaching the modular cable protector to an adjacent modular cable protector; said hand rail member comprising:
   a body with a supporting base;
   connectors for removably attaching the body to connectors on a modular cable protector;
   a passageway in the body in alignment with the channel of the modular cable protector; and
   a hand rail extending along the top of the body.

2. The hand rail member of claim 1 wherein the passageway extends across the base of the body.

3. The hand rail member of claim 1 wherein the body has a substantially triangular vertical cross-section.

4. The hand rail member of claim 1 wherein the body further comprises a recess for holding weights to stabilize the hand rail member.

5. The hand rail member of claim 1 wherein the body further comprises an interior void with an opening for filling the void with material to stabilize the hand rail member.

6. The hand rail member of claim 1 wherein the hand rail has an elevation of approximately 20 to 40 inches above the base of the body.

7. The hand rail member of claim 1 further comprising a hand grip recessed into the hand rail member.

8. A hand rail member for removable attachment to a modular cable protector having at least one channel, opposing side ramps extending laterally outward from the channel, and connectors for removable attachment to complementary connectors on an adjacent modular cable protector; said hand rail member comprising:
   a body with a supporting base;
   connectors for removably attaching the body to connectors on a modular cable protector;
   a passageway in the base of the body in alignment with the channel of the modular cable protector allowing the modular cable protector to be removably connected to an adjacent modular cable protector; and
   a hand rail extending along the top of the body.

9. The hand rail member of claim 8 wherein the passageway extends across the base of the body.

10. The hand rail member of claim 8 wherein the body has a substantially triangular vertical cross-section.

11. The hand rail member of claim 8 wherein the hand rail has an elevation of approximately 20 to 40 inches above the base of the body.

12. The hand rail member of claim 8 further comprising a hand grip recessed into the hand rail member.

13. The hand rail member of claim 8 wherein the body further comprises a recess for holding weights to stabilize the hand rail member.

14. The hand rail member of claim 8 wherein the body further comprises an interior void with an opening for filling the void with material to stabilize the hand rail member.

15. A hand rail member for removable attachment to a modular cable protector having a central portion with at least one channel and connectors for removable attachment to complementary connectors on the central portion of an adjacent modular cable protector, and opposing side ramps extending laterally outward from the channel with connectors for removable attachment to complementary connectors on side ramps of an adjacent modular cable protector; said hand rail member comprising:
   a body with a supporting base;
   connectors for removably attaching the body to connectors on the side ramps of a modular cable protector;
   a recessed passageway extending across the base of the body allowing the hand rail member to sit atop the central portion of a modular cable protector and enabling the connectors on the central portion of the modular cable protector to removably attach to complementary connectors on the central portion of an adjacent modular cable protector; and
   a hand rail extending along the top of the body.

16. The hand rail member of claim 15 wherein the body has a substantially triangular vertical cross-section.

17. The hand rail member of claim 15 wherein the hand rail has an elevation of approximately 20 to 40 inches above the base of the body.

18. The hand rail member of claim 15 further comprising a hand grip recessed into the hand rail member.

19. The hand rail member of claim 15 wherein the body further comprises a recess for holding weights to stabilize the hand rail member.

20. The hand rail member of claim 15 wherein the body further comprises an interior void with an opening for filling the void with material to stabilize the hand rail member.

* * * * *